July 26, 1955  D. T. KRAUSE  2,713,714
CUT-OFF TOOL BITS
Filed Nov. 14, 1952

INVENTOR
David T. Krause.
BY Vernon A. Dorsey
ATTORNEY

United States Patent Office 2,713,714
Patented July 26, 1955

2,713,714

CUT-OFF TOOL BITS

David Thomas Krause, Liberty District, W. Va., assignor to Wheeling Machine Products Company, Wheeling, W. Va., a corporation of West Virginia Application November 14, 1952, Serial No. 320,521

1 Claim. (Cl. 29—95)

This invention relates to improvements in cut-off tool bits.

The invention is more particularly concerned with a cut-off tool bit for use in an automatic cut-off machine wherein the work is supported for rotation about its axis while the cut-off bit is power driven into cutting engagement with a relatively narrow circumferential surface of the work.

Cut-off bits initially comprised a relatively long steel bar of substantial width or depth and which tapered in thickness from one edge thereof to the other. Furthermore such bits had their cutting ends tapered in from the wider edge to the narrower edge and the juncture of such inclined end with the wider edge was ground to provide a cutting edge.

The purpose of the referred to tapers was to provide bit clearance in the circumferential groove provided in the work as the cutting edge advanced toward the axis thereof.

While this initial form of bit was satisfactory to the extent of its function of cutting off, nevertheless difficulty was experienced with the chip or the thin band of steel removed by the bit since same remained in a single length and caused considerable trouble in the handling thereof.

This difficulty finally resulted in the provision of what is now known as a chip breaker or a means associated with the bit which caused the chip to be successively broken as it was removed from the work by the cutting edge on the bit.

Such chip breaker consisted in providing a notch in the bit at the juncture of the wide edge and the forward end and then grinding the junction of the end surface and adjacent surface of the notch to provide the cutting edge, and the surface of the notch was found to provide a concave shoulder immediately below the wide or top edge of the bit for causing emergence and breaking of the chip.

While such provision of a chip breaker overcame the difficulty formerly experienced in the handling of the continuous chip, it nevertheless introduced another difficulty which was as follows:

By the provision of the notch at the position referred to, the cutting edge was disposed below the upper or wider edge of the downwardly tapered bit with the result that such cutting edge was not in the widest part of the bit. In other words the cutting edge provided a circumferential groove of successively increased depth of a width equal to that of the cutting edge, but a longitudinal portion of the bit above such cutting edge was wider than the cutting edge and consequently wider than the groove provided by the cutting edge. This caused the tool to jam in the groove with consequences of breaking the bit or impairing the temper thereof occasioned by friction generated heat.

A primary object of the present invention is therefore to provide a cut-off bit having a chip breaker of substantially the form initially provided but which wholly avoids jamming in the groove formed thereby in the work.

A further object of the invention is to provide a cut-off bit having a cutting edge at the widest portion thereof and a chip deflecting and breaking shoulder disposed above the cutting edge.

Other objects and advantages of the invention will become apparent in the course of the following detailed description, taken in connection with the accompanying drawing, wherein—

Figure 1:
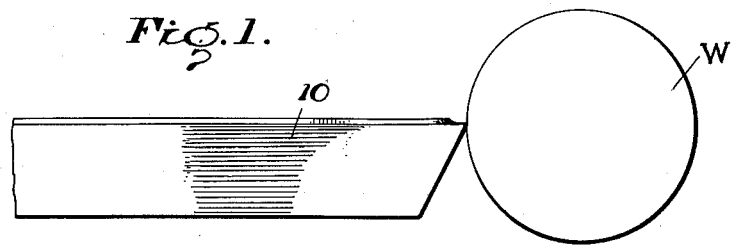
Fig. 1 is a diagrammatic view showing the improved bit in operative association with work being operated upon thereby.
Figure 2:
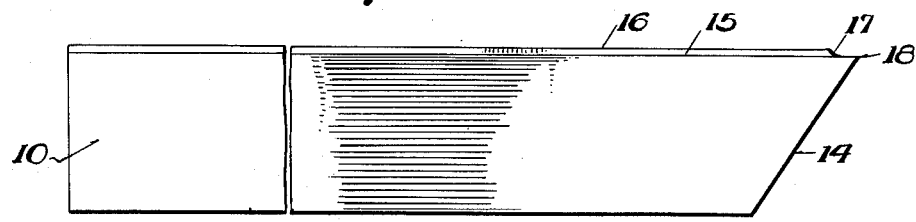
Fig. 2 is a broken side elevational view of the improved bit.

Referring now in detail to the drawing, the improved bit is identified in its entirety as 10.

The bit is in the form of an elongated bar of tool steel and is adapted to be supported in an automatic cut-off machine and advanced thereby into cutting engagement with work W, suitably supported by said machine and having a rotating movement imparted thereto, while the bit is being advanced.

The final form of the improved bit might better be appreciated from a description of the forming of same.

The bit, as before stated, comprises an elongated bar 10 of tool steel which is initially formed with downwardly tapered opposite side walls 11 thereby providing a relatively wide top edge 12 and a relatively narrow bottom edge 13. Also the front or advancing end of the bar is inwardly tapered at 14 from the wider edge 12 to the narrower edge 13.

The referred to tapers are provided for clearance of the bit in the groove provided thereby in the work in the course of a cutting-off operation. The bar is next provided with a longitudinal notch 15 at each of the opposite corners of the top wider edge and extended throughout the length of such edge.

The provision of the notches 15 provides a top portion 16 of less width than that of the bar at the horizontal bases of the notches 15.

Figure 3:
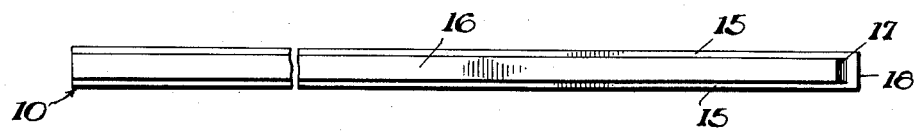
Fig. 3 is a top plan view of the improved bit.
Figure 4:
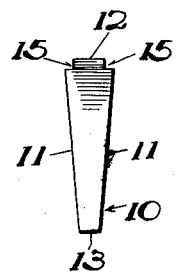
Fig. 4 is a front elevational view of the improved bit.

Finally the end of the bit is ground resulting in a chip deflecting and breaking concave wall or shoulder 17 in the top portion 16 and a cutting edge 18 which is in the horizontal plane of the widest portion of the bit. As is indicated in Fig. 3, the cutting edge 18 is preferably disposed at a slight angle to a plane normal to the bit for more perfect cutting action. The shoulder 17 may be parallel with the cutting edge but is preferably disposed at a slight angle to the longitudinal axis of the bit.

While I have disclosed my invention in accordance with a single specific structural embodiment thereof, such is to be considered as illustrative only and not restrictive, the scope of the invention being defined in the sub-joined claim.

What I claim and desire to secure by U. S. Letters Patent is:

A bit for use with automatic cut-off machines comprising an elongated bar having a relatively narrow lower edge surface, opposite side walls diverging upwardly from said lower edge surface and terminating in laterally opposed parallel edges in a plane parallel with said lower edge surface, said bar further comprising a forward end surface inclined upwardly and forwardly from said lower edge surface and terminating in said plane, said bar further comprising a surface in said plane in intersecting relation to said end surface and providing therewith a cutting edge extending from one of said laterally opposed edges to the other thereof, said bar further comprising an elongated integral portion above said plane of relatively small depth extending substantially the length of said bar and having parallel side edge walls spaced laterally inwardly from said laterally opposed edges, said portion terminating rearwardly of said cutting edge, and a concave wall on the forward end of said portion extending from the top thereof to said surface in said plane providing a chip breaker.

References Cited in the file of this patent

UNITED STATES PATENTS

| | | |
|---|---|---|
| 1,974,215 | Kilmer | Sept. 18, 1934 |
| 2,202,591 | Luers | May 28, 1940 |

FOREIGN PATENTS

| | | |
|---|---|---|
| 110,410 | Great Britain | Oct. 25, 1917 |

OTHER REFERENCES

Article in American Machinist, December 1946 by W. B. Kennedy, page 143.

Article in Tool and Die Journal, July 1946 by A. W. Ehlers, pp. 81–83.